US007354498B2

(12) United States Patent
Jenkins et al.

(10) Patent No.: US 7,354,498 B2

(45) Date of Patent: Apr. 8, 2008

(54) PALLET LABELER SYSTEM

(75) Inventors: Gary E. Jenkins, Mason, OH (US); Gregory W. Reichling, Cincinnati, OH (US)

(73) Assignee: Kolinahr Systems, Inc., Cincinnati, OH (US)

( * ) Notice: Subject to any disclaimer, the term of this patent is extended or adjusted under 35 U.S.C. 154(b) by 0 days.

(21) Appl. No.: 11/682,033

(22) Filed: Mar. 5, 2007

(65) Prior Publication Data

US 2007/0158029 A1 Jul. 12, 2007

Related U.S. Application Data

(60) Division of application No. 10/700,142, filed on Nov. 3, 2003, now Pat. No. 7,185,689, which is a continuation-in-part of application No. 09/690,238, filed on Oct. 17, 2000, now Pat. No. 6,672,356.

(51) Int. Cl.

| | |
|---|---|
| ***B29C 65/78*** | (2006.01) |
| ***B32B 37/00*** | (2006.01) |
| ***B32B 38/14*** | (2006.01) |
| ***B32B 43/00*** | (2006.01) |

(52) U.S. Cl. ................. 156/277; 156/289; 156/DIG. 2; 156/DIG. 25; 156/DIG. 37; 156/DIG. 45; 156/DIG. 47; 156/DIG. 53

(58) Field of Classification Search ................ 156/247, 156/277, 289, 350, 351, 354, 358, 360, 363, 156/378, 379, 384, 387, 540, 541, 542, 566, 156/580, 581, DIG. 1–DIG. 4, DIG. 25, 156/DIG. 28, DIG. 33, DIG. 37, DIG. 42, 156/DIG. 44, DIG. 45, DIG. 47

See application file for complete search history.

(56) References Cited

U.S. PATENT DOCUMENTS 3,218,216 A 11/1965 Stephens et al.
4,423,486 A * 12/1983 Berner ........................ 705/416
4,595,447 A 6/1986 Lindstrom
4,615,757 A 10/1986 Treiber
4,927,486 A 5/1990 Fattal et al.

(Continued)

FOREIGN PATENT DOCUMENTS

EP 0608296 B1 8/1994

(Continued)

OTHER PUBLICATIONS

English Translation of WO 93/08081.*

*Primary Examiner*—Philip Tucker
*Assistant Examiner*—Chan Sing Po
(74) *Attorney, Agent, or Firm*—Wood, Herron & Evans, LLP

(57) ABSTRACT

A pallet labeler station for applying a printed label to a loaded pallet at a predetermined label position includes a label printer for printing a label to be affixed to the loaded pallet, a rotatable label applicator mechanism for applying the printed label to the loaded pallet at the predetermined label position and a drive mechanism for moving the label applicator mechanism so as to apply the printed label to the loaded pallet at the predetermined label position. The label applicator mechanism is capable of applying printed labels to two sides of a loaded pallet with each label being applied at a predetermined label position defined for each of the two sides of the loaded pallet.

8 Claims, 14 Drawing Sheets

U.S. PATENT DOCUMENTS

| | | | |
|---|---|---|---|
| 5,141,572 | A | 8/1992 | Gerber |
| 5,232,539 | A | 8/1993 | Carpenter et al. |
| 5,472,552 | A | 12/1995 | Speranza et al. |
| 5,865,918 | A | 2/1999 | Franklin et al. |
| 5,940,293 | A | 8/1999 | Schwenke et al. |
| 6,615,106 | B2 | 9/2003 | Soto et al. |
| 6,672,356 | B1 | 1/2004 | Jenkins et al. |

FOREIGN PATENT DOCUMENTS

| | | |
|---|---|---|
| WO | 9308081 | 4/1993 |

* cited by examiner

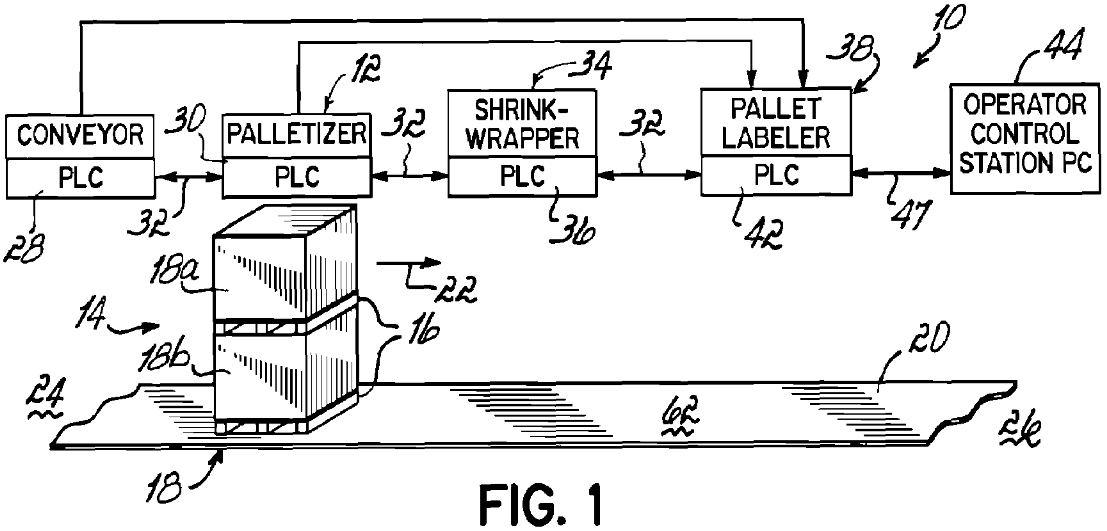
FIG. 1
| PRODUCT ID CODE OR PALLET ID NO. | LABEL POSITION DATA | |
|---|---|---|
| | LOWER POSITION | UPPER POSITION |
| 1. XXXXXXXX | XX | XX |
| 2. XXXXXXXX | XX | XX |
| 3. XXXXXXXX | XX | XX |
| 4. XXXXXXXX | XX | XX |
| ⋮ | ⋮ | ⋮ |
200
FIG. 6C
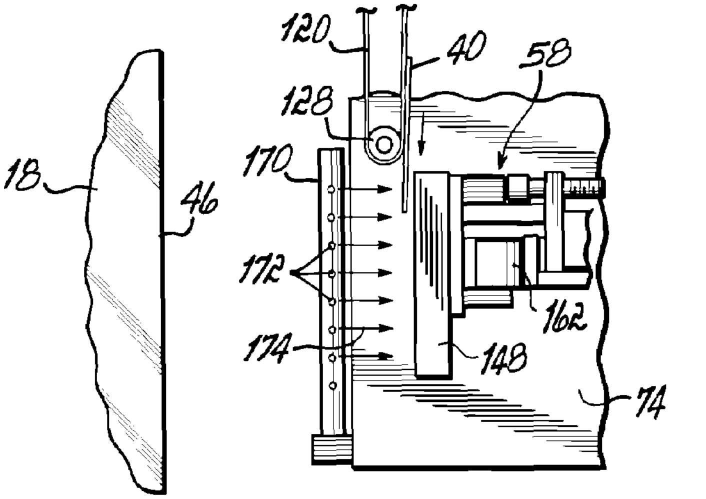
FIG. 7A

PALLET LABELER SYSTEM

The present application is a divisional application of U.S. Ser. No. 10/700,142, filed Nov. 3, 2003, now U.S. Pat. No. 7,185,689, which is a continuation-in-part of U.S. Ser. No. 09/690,238, filed Oct. 17, 2000, now U.S. Pat. No. 6,672,356, the disclosures of which are hereby incorporated herein by reference in their entirety.

FIELD OF THE INVENTION

The present invention relates generally to loaded pallet handling systems and, more particularly, to a system and method for applying a printed label to a loaded pallet that identifies the goods loaded onto the pallet.

BACKGROUND OF THE INVENTION

Pallets are used to store and transport loads of a vast range of goods. For example, a pallet can be used to transport boxes of goods that have been stacked and stretch-wrapped or otherwise secured upon the pallet from a manufacturer to a point of sale. Proper identification of the goods loaded onto the pallet, and of the loaded pallet itself, is critical to assist in proper routing of the loaded pallet within a warehouse or distribution center, and also at a customer's facility.

In the past, printed labels have been applied to loaded pallets that contain label information pertinent to the product or goods loaded onto the pallet, such as the product identification code, pallet identification code, quantity, lot number, customer or order identification data and routing codes. These printed labels have been either affixed to the loaded pallet by hand or, more recently, by semi-automated pallet labeler systems that are capable of applying one or more printed labels to the loaded pallets as the loaded pallets are transported intermittently on a conveyor past the pallet labeler system. Proper positioning of the label on the loaded pallet is important to ensure that the label is not affixed in an irregular area of the loaded pallet or at a position that cannot be read by a scanner or other device that controls routing of the loaded pallet in an automated warehouse or distribution center environment.

More particularly, pallet labeler systems have been developed in the past that are capable of printing labels with pre-selected pallet and/or product identification information and applying printed labels to one side of a loaded pallet at one or more predetermined positions, such as upper and lower label positions on the same pallet load. Prior pallet labeler systems having included a label applicator mechanism that is capable of receiving printed labels from a label printer and transporting the printed labels toward the loaded pallet for applying the printed labels thereto at the predetermined label positions. Positioning of the label applicator mechanism relative to the loaded pallet has been accomplished through a ball screw drive mechanism having electro-mechanical limit switches that set the predetermined upper and lower label positions.

For example, known pallet labeler systems have included a label applicator mechanism that is movable in upward and downward vertical directions under the control of the ball screw drive mechanism. The label applicator mechanism is moved by the ball screw mechanism so as to apply printed labels to the loaded pallet at the predetermined upper and lower label positions. The electro-mechanical limit switches are manually adjusted and set in the ball screw drive mechanism so that the label applicator mechanism will move and stop at the upper and lower label positions when the respective upper and lower limit switches are actuated. However, when label positions are to be changed, such as when a loaded pallet having a different configuration is to be labeled, the limit switches must be manually adjusted and set according to the new label positions. This is not only time consuming and cumbersome, but also severely limits the ability of the pallet labeler system to efficiently label a wide range of loaded pallets having many different predetermined label positions.

In known pallet labeler systems, the printed label is applied to the loaded pallet through a tamp pad that is pivotally mounted on a forward end of an applicator arm. The tamp pad is positioned to receive a printed label from the label printer, and to transport the printed label toward the loaded pallet to apply the label thereto. A photo optic sensor mounted on the tamp pad senses the loaded pallet and is used to retract the tamp pad from the loaded pallet after the printed label has been applied. However, the photo optic sensor used to sense the loaded pallet is prone to cause the tamp pad to retract before the label has been completely applied to the loaded pallet. This may be caused by reflections from the stretch-wrap material or in situations where the stretch-wrap is loosely spaced from the underlying goods. In either case, the photo optic sensor improperly causes the tamp pad to retract before sufficient contact between the label and the loaded pallet has occurred.

The tamp pad in known pallet labeler system includes apertures and bores that are in fluid communication with a vacuum source fluidly connected to the tamp pad through a vacuum hose. An air assist tube emits pressurized air toward the printed label as it separates from its backing web at the label printer to move the label into engagement with the tamp pad. Vacuum pressure is applied to the tamp pad to hold the printed label thereto as the tamp pad is extended toward the loaded pallet to apply the label. However, in the past, the pressurized air source connected to the air assist tube and the vacuum source connected to the tamp pad have each run continuously throughout the entire label printing and application process. As a result, the apertures in the tamp pad tend to become clogged over time with dust and other contaminants and the tamp pad eventually loses its ability to reliably hold the printed labels. Further, a large amount of air is used in the label printing and application process.

Thus, there is a need for a pallet labeler system that is capable of efficiently applying printed labels to a wide range of loaded pallets having many different predetermined label positions.

There is also a need for a pallet labeler system that reliably applies printed labels to loaded pallets with sufficient contact to ensure the printed label is held thereto.

There is yet also a need for a pallet labeler system that uses pressurized air and vacuum sources efficiently during the entire label printing and application process.

There is also a need for a pallet labeler system that is capable of efficiently applying printed labels to multiple sides of a loaded pallet having many different predetermined label positions.

SUMMARY OF THE INVENTION

The present invention overcomes the foregoing and other shortcomings and drawbacks of pallet labeler systems and methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a pallet labeler system is provided that is capable of efficiently and reliably applying printed labels to a single side or to adjacent sides of a loaded pallet at a multiplicity of predetermined label positions. The pallet labeler system includes a label printer that is capable of printing preselected pallet and/or product identification information on a label. A label applicator mechanism is operatively connected to the label printer for receiving printed labels from the label printer. The label applicator mechanism is mounted for rotation relative to the loaded pallet and includes a tamp pad that is capable of holding and transporting a printed label toward the loaded pallet for applying the printed labels thereto at predetermined label positions on a single side or adjacent sides of the loaded pallet.

In accordance with one aspect of the present invention, the pallet labeler station includes a drive mechanism for variably moving the label applicator mechanism so as to apply printed labels to the loaded pallet at predetermined label positions on a single side or adjacent sides of the loaded pallet. A programmable control is operatively coupled to the drive mechanism and is capable of receiving "label position data" that defines the predetermined label positions for the printed labels to be applied to the loaded pallet. The "label position data" is preferably received either from an upstream loaded pallet handling station or is obtained from a look-up table. The programmable control, in response to receiving the "label position data", causes the drive mechanism to move the label applicator mechanism so as to apply the printed label to the loaded pallet at the predetermined label positions defined by the "label position data".

In accordance with another aspect of the present invention, the label applicator mechanism includes a label applicator arm which is mounted to a rotary actuator. The rotatable label applicator arm has one end supported by the rotary actuator and a free end which supports a label applicator head. The label applicator head is rotated by the label applicator arm into contact with a single side or multiple sides of the loaded pallet so as to apply the printed labels to the loaded pallet at the predetermined label positions defined by the "label position data" which may be the same or different for each side of the loaded pallet.

The pallet labeler system of the present invention has the particular advantage of applying printed labels to a single side or to adjacent sides of a loaded pallet at a multiplicity of label positions. The drive mechanism provides variable movement of the label applicator mechanism relative to the loaded pallet. The predetermined label positions are defined in software by the "label position data" which is either received from an upstream loaded pallet handling station or is obtained from a look-up table. The combination of the pre-programmed "label position data", drive mechanism and rotatable label applicator mechanism provide for accurate, repeatable and efficient application of printed labels to pallet loads at a multiplicity of variable label positions on a single side or adjacent sides of a loaded pallet.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a diagrammatic view of an illustrative pallet handling system including a pallet labeler system in accordance with the principles of the present invention;

FIG. 6C is a diagrammatic representation of a look-up table including label position data;

FIG. 7A is a diagrammatic view illustrating an air assist tube of the pallet labeler system emitting pressurized air to move a printed label into engagement with the label applicator head;

DETAILED DESCRIPTION OF SPECIFIC EMBODIMENTS

Figure 2:
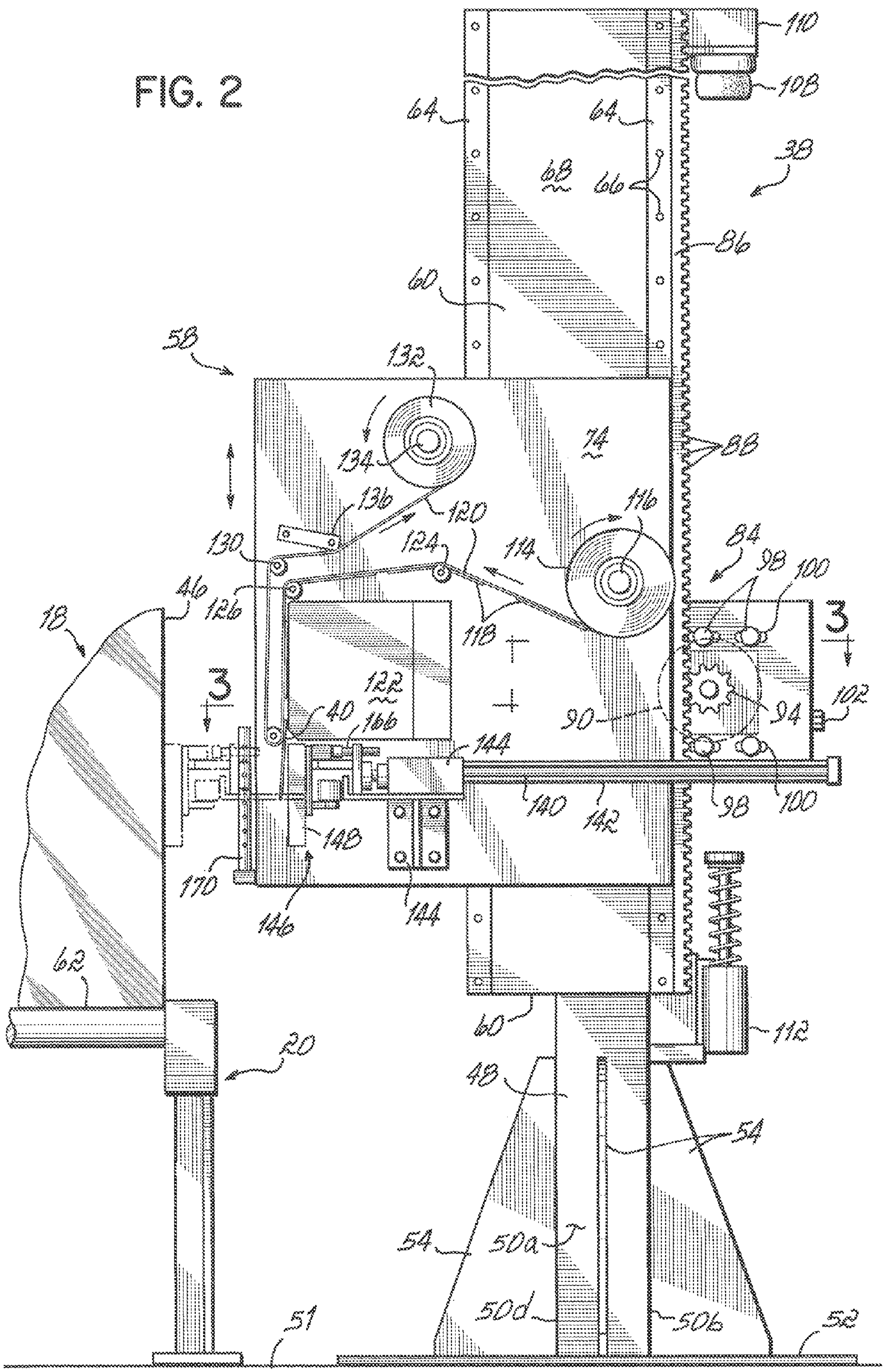
FIG. 2 is a side elevational view showing the pallet labeler system in a lowered position for applying a printed label to one side of a loaded pallet at a lower position.

With reference to the figures, and to FIG. 1 in particular, an illustrative loaded pallet handling system 10 in accordance with the principles of the present invention is shown. Pallet handling system 10 includes a palletizer station 12 for loading products or goods, indicated generally at 14, onto standard pallets 16 as is well known in the art. As shown in FIG. 1, a stacked pallet 18 includes two (2) pallet loads 18*a*, 18*b* that are carried in stacked formation on a conventional conveyor 20 in the direction indicated by arrow 22 from an upstream end 24 of the pallet handling system 10 to a downstream end 26. Operation of the conveyor 20 is controlled by a conventional programmable logic controller (PLC) 28 that communicates with a PLC 30 of the palletizer station 12 through a data communication link 32 as is well known in the art. The conveyor PLC 28 and the palletizer station PLC 30 communicate over the data communication link 32 so that the palletizer station 12 releases the loaded pallets 18 of goods in the proper timing and sequence for further downstream processing of the loaded pallets 18.

For example, pallet handling system 10 includes a stretch-wrapper station 34 positioned downstream of the palletizer station 12 for stretch-wrapping the loaded pallet 18 as is known in the art. Stretch-wrapper station 34 includes a PLC 36 that communicates with the conveyor PLC 28 and the palletizer station PLC 30 over the data communication link 32 so that information about incoming loaded pallets 18 can be processed by the stretch-wrapper station 34. In accordance with the principles of the present invention, a pallet labeler station 38 is positioned downstream of the stretch-wrapper station 34 for applying a printed label 40 (FIG. 2) to one side of the loaded pallet 18. The printed label 40 includes information pertinent to the products or goods loaded onto the pallet 16, such as the product identification code, pallet identification code, quantity, lot number, customer or order identification data and routing codes, to assist in identifying and routing of the particular pallet of goods within the warehouse or distribution center and also at a customer's facility.

Pallet labeler station 38 is the focus of the present invention and includes a PLC 42 and operator control station PC 44 for controlling the printing and application of printed labels 40 to the side of the loaded pallet 18. As will be described in greater detail below, pallet labeler station 38 is designed to apply printed labels 40 at one or more predetermined locations on a side 46 of the loaded pallet 18 as the loaded pallet 18 is carried intermittently on conveyor 20 past the pallet labeler station 38. In a preferred embodiment of the present invention, the PLC 42 of pallet labeler station 38 communicates through the data communication link 32 with one or more of the upstream conveyor PLC 28, palletizer station PLC 30 and/or stretch-wrapper station PLC 36 so that information about incoming loaded pallets 18 can be processed by the pallet labeler station 38 to ensure that the printed labels 40 are affixed to the loaded pallets 18 at predetermined label positions for that particular pallet of goods. The pallet labeler PLC 42 communicates with the operator control station PC 44 through a data communication link 47, such as an RS 232 serial communication link.

Referring now to FIGS. 2-5B, the pallet labeler station 38 will be described in accordance with one embodiment of the present invention. In this embodiment, the pallet labeler station 38 will be described in connection with applying printed labels 40 at one or more predetermined height locations on the side 46 of the loaded pallet 18. Of course, those of ordinary skill in the art will readily appreciate that other relative positioning of the printed labels 40 on the side 46 of the loaded pallet 18, such as in horizontal or other orientations, is possible without departing from the spirit and scope of the present invention. Additionally, the term "side" as used herein is intended to describe any side of a loaded pallet, and is not intended to exclude the top and bottom of a loaded pallet that are considered to be sides of the loaded pallet as well.

Figure 2A:
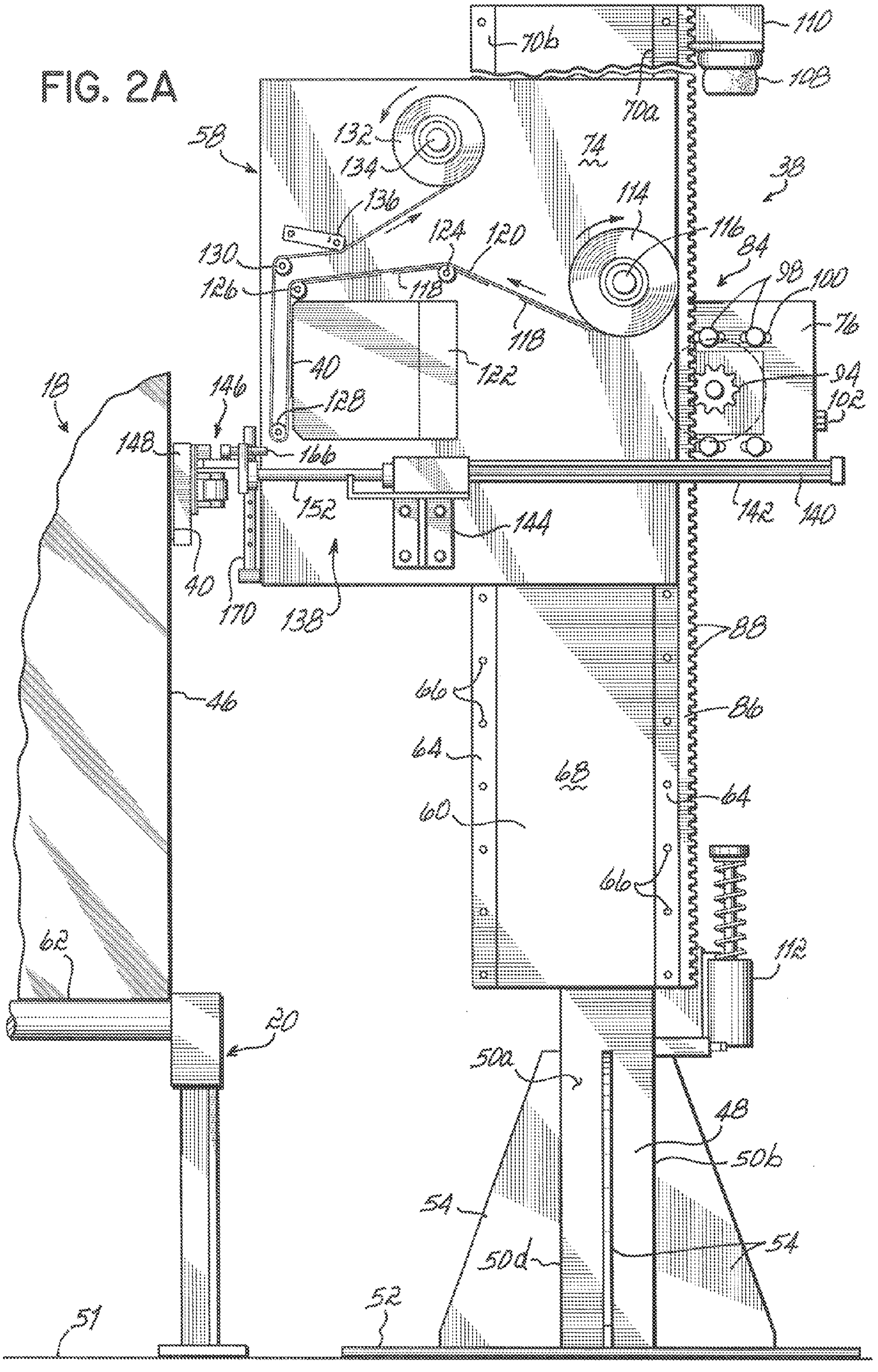
FIG. 2A is a view similar to FIG. 2 showing the pallet labeler system in a raised position for applying a printed label to the one side of the loaded pallet at an upper position.
Figure 3:
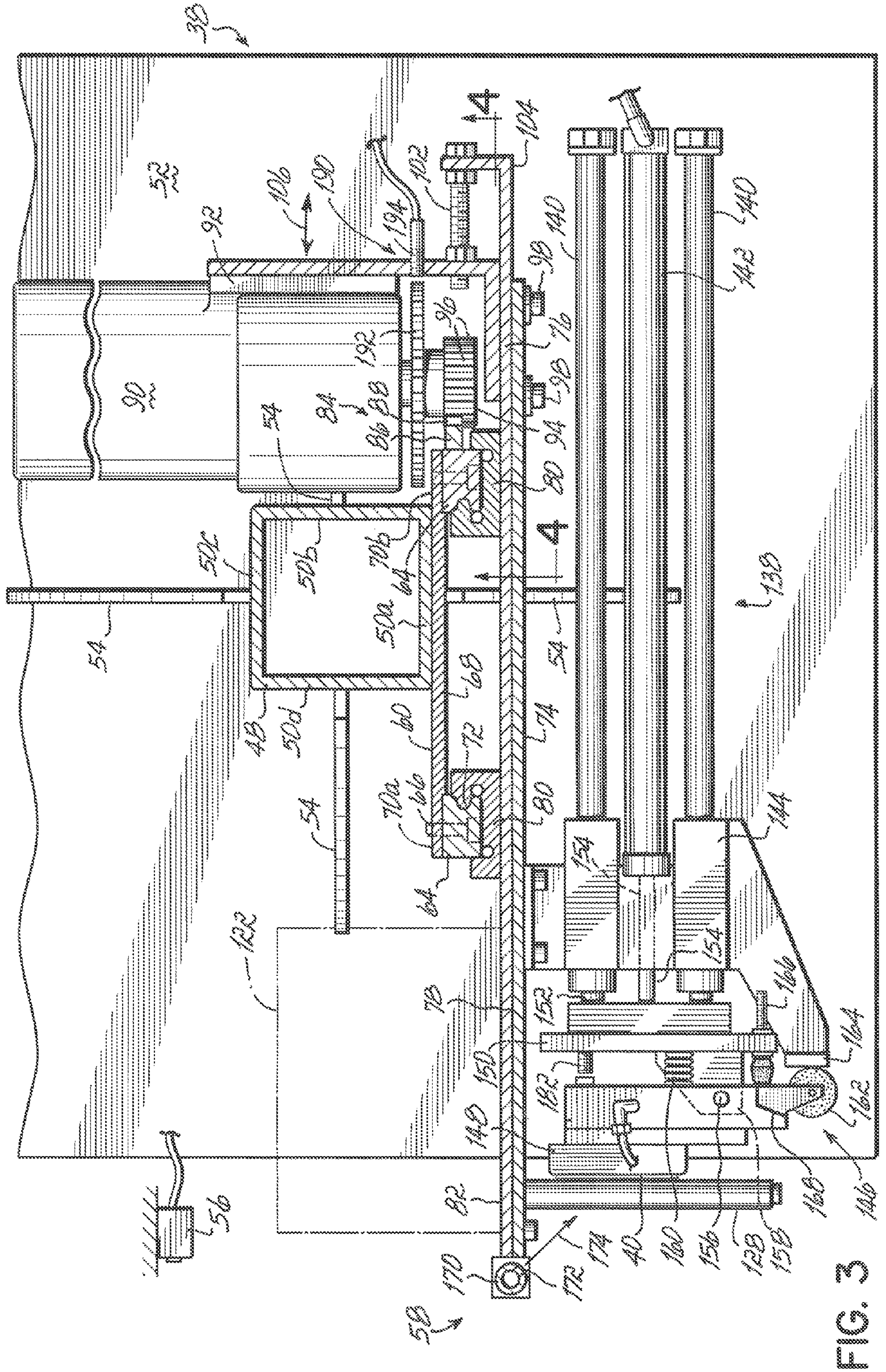
FIG. 3 is a cross-sectional view taken along line 3-3 in FIG. 2.

As shown in FIGS. 2, 2A and 3, pallet labeler system 38 includes an upstanding support pedestal 48 in the form of an elongated, hollow square tube having elongated, generally planar sides 50*a-d*. Support pedestal 48 is mounted to the floor 51 through fasteners (not shown) that extend through an enlarged support base 52 attached at the bottom of the pedestal 48. Four (4) support brackets 54 are mounted respectively to each side 50*a-d* of the support pedestal 48 and to the support base 52 for adding strength and rigidity to the overall structure. The support pedestal 48 is mounted in spaced relationship to the conveyor 20 so that loaded pallets 18 are conveyed toward the pallet labeler station 38 and stopped during the label application process as will be described in detail below. A sensor 56 (FIG. 3), such as a photo-eye detector, is mounted upstream of the pallet labeler station 38 and is coupled to the labeler PLC 42. At the appropriate time, the sensor 56 applies a signal to the labeler PLC 42 which signals the conveyor PLC 28 to stop movement of the loaded pallet 18 so that the loaded pallet 18 is stopped and positioned to receive one or more printed labels 40 on the one side 46 of the loaded pallet 18 facing the pallet labeler station 38, as shown in FIGS. 2, 2A and 3.

Further referring to FIGS. 2, 2A and 3, pallet labeler station 38 includes a carriage assembly 58 that is mounted for vertical movement relative to the support pedestal 48. More particularly, the support pedestal 48 includes an elongated mounting plate 60 welded to side 50*a* of the pedestal 48 that extends vertically from approximately the height of the conveying surface 62 of conveyor 20 to approximately twenty-four (24) inches above the highest height of a loaded pallet to be labeled. The mounting plate 60 is preferably made of metal. As shown in FIG. 3, a pair of elongated rails 64 are mounted through fasteners 66 to extend outwardly from a front surface 68 of the mounting plate 60 along opposite longitudinal edges 70*a*, 70*b* of the mounting plate 60. The rails 64 include opposing longitudinally extending grooves 72 positioned forwardly of the front surface 68 that form elongated bearing surfaces for supporting the carriage assembly 58 as it moves vertically relative to the support pedestal 48.

The carriage assembly 58 includes a carriage mounting plate 74 and a support pedestal mounting plate 76 secured to a rearward surface 78 (FIG. 3) of the carriage mounting plate 74. Preferably, the carriage mounting plate 74 and support pedestal mounting plate 74 are made of metal. As shown in FIG. 3, the carriage assembly 58 includes multiple elongated roller bearing blocks 80 mounted to a rearward surface 82 of the support pedestal mounting plate 76 that cooperate with the rails 64 mounted on the mounting plate 60. The rails 64 and roller bearing blocks 80 are configured to permit relative vertical movement between the carriage assembly 58 and the support pedestal 48 with minimal friction.

Figure 4:
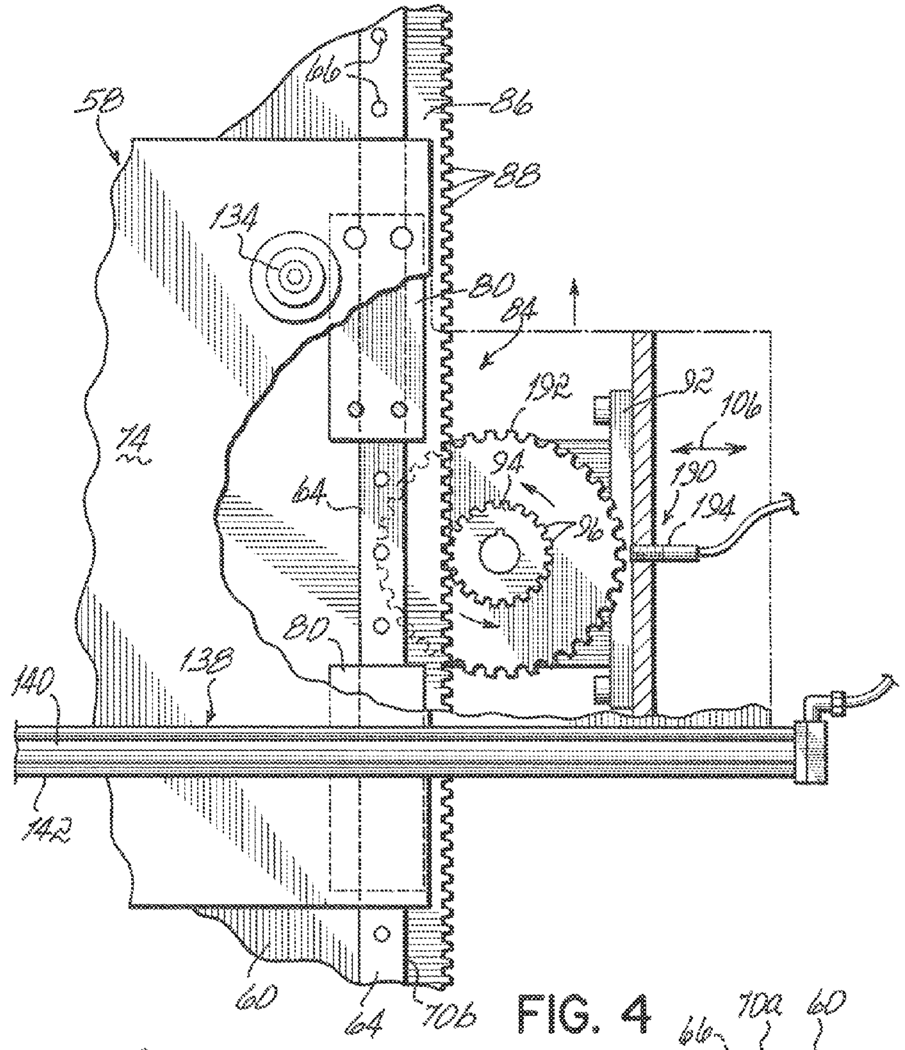
FIG. 4 is a cross-sectional view taken along line 4-4 of FIG. 3.

In a preferred embodiment of the present invention, movement of the carriage assembly 58 in opposite vertical directions relative to the support pedestal 48 is provided by a rack and pinion drive mechanism, indicated generally at 84 (FIG. 3). More particularly, the rack and pinion drive mechanism 84 includes an elongated rack member 86 that is mounted to extend generally parallel to the support pedestal mounting plate 76 and along longitudinal edge 70*b*, as shown in FIGS. 2-4. Rack member 86 includes a plurality of teeth 88 spaced vertically along the longitudinal length of the rack member 86. Rack and pinion drive mechanism 84 further includes a motor 90 (FIG. 3) that is mounted to the carriage assembly 58 through motor mounting bracket 92. A pinion 94 having circumferentially spaced teeth 96 (FIG. 3) is mounted to the output of the motor 90 and is adapted to move into and out of engagement with the rack member 86. In particular, motor mounting bracket 92 is mounted to the support pedestal mounting plate 76 of carriage assembly 58 through bolted connections 98. Support pedestal mounting plate 76 has elongated slots 100 formed therethrough that receive the bolted connections 98. An adjustment screw 102, as shown in FIG. 3, is connected to a lip 104 (FIG. 3) of support pedestal mounting plate 76 and the motor mounting bracket 92. When the bolted connections 98 attaching the motor mounting bracket 92 to the support pedestal mounting plate 76 are sufficiently loosened, the pinion 94 connected to motor 90 can be moved into and out of engagement with the rack member 86, as indicated by arrow 106 in FIG. 3, by either tightening or loosening the adjustment screw 102. The elongated slots 100 formed in the support pedestal mounting plate 76 accommodate horizontal movement of the bolted connections 98 during the adjustment process. Upper movement of the carriage assembly 58 relative to the support pedestal 48 is limited by a bumper 108 mounted to the support pedestal mounting plate 76 through a bumper bracket 110. Downward movement of the carriage assembly 58 is limited by a spring-biased shock absorber 112 mounted to the support pedestal 48.

In a preferred embodiment of the present invention, carriage assembly 58 supports various components that are used for printing and applying one or more printed labels 40 to the side 46 of loaded pallet 18. In particular, carriage assembly 58 supports a roll of labels 114 on shaft 116 so that blank labels 118 are conveyed on backing web 120 through a label printer 122 mounted on the carriage assembly 58 where they are printed with preselected pallet and/or product identification information prior to being applied to the loaded pallet 18. The backing web 120 is conveyed on rollers 124, 126, 128 and 130, and is taken up on take-up roll 132 mounted on shaft 134 after the labels are printed and applied. A tensioning idler 136 is provided to tension the backing web 120 as it travels from the feed roll 114 to the take-up roll 132. While not shown, it will be appreciated that a drive mechanism is operatively connected to the shafts 116 and 134 to ensure proper movement of the backing web 120 and blank labels 118 through the label printer 122 during the label printing and application process. One suitable printer for printing the printed labels 40 is the Model No. 170PAX2 OEM Print Engine commercially available from Zebra Technologies Corporation of Vernon Hills, Ill., although other label printers may be suitable as well. Label printer 122 is preferably a thermal transfer printer capable of printing text, high-resolution bar codes and/or graphic images.

In accordance with the principles of the present invention, printed labels 40 are applied to side 46 of loaded pallet 18 through a label applicator mechanism 138 carried on the carriage assembly 58. Label applicator mechanism 138 includes a pair of spaced apart guide tubes 140 and a central pneumatic drive cylinder 142 that are mounted in horizontal orientation to carriage assembly 58 through support bracket 144. A label applicator head 146 is carried on a forward end of the label applicator mechanism 138 and includes a vacuum platen or tamp pad 148 that is pivotally mounted to a label applicator head mounting plate 150. As will be described in detail below, label applicator head 146 is operatively coupled to the label printer 122 for receiving labels 40 printed by the label printer 122 and at least temporarily holding the printed labels 40 on the tamp pad 148 during the label application process.

The label applicator head mounting plate 150 include a pair of elongated guide rods 152 that are slidably received in the respective pair of guide tubes 140, and a central applicator arm 154 that is adapted to extend toward and retract from the loaded pallet 18 under the control of the pneumatic drive cylinder 142. To this end, pneumatic drive cylinder 142 includes pressurized air inlets and air outlets as appreciated by those of ordinary skill in the art that permit the label applicator head 146 to be accurately and reliably moved toward and away from the loaded pallet 18 during the label application process as described in greater detail below.

Figure 5A:
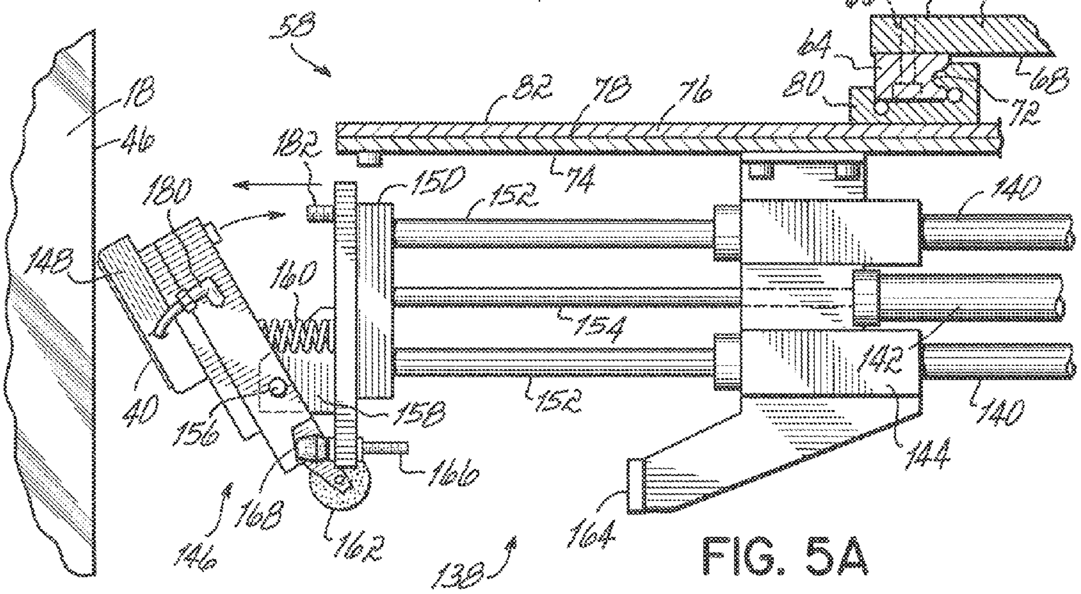
FIG. 5A is a partial top view showing a label applicator head of the pallet labeler system moving toward the loaded pallet in a transport position for transporting a printed label toward the one side of the loaded pallet.
Figure 5B:
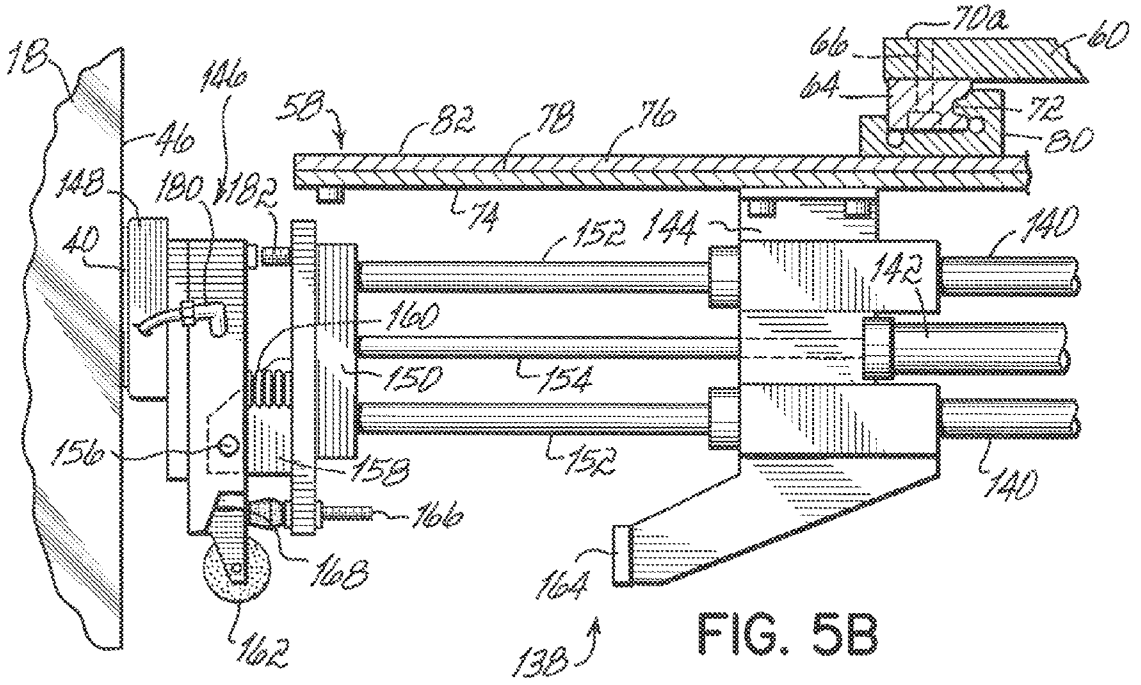
FIG. 5B is a view similar to FIG. 5A showing the label applicator head fully extended in an application position for applying the printed label to the one side of the loaded pallet.

As best understood with reference to FIGS. 3, 5A and 5B, label applicator head 146 is pivotally mounted to label applicator head mounting plate 150 through pivot pin 156 that extends through the label applicator head 146 and a bracket 158 extending forwardly from the mounting plate 150. The label applicator head 146 is biased through spring 160 to pivot outwardly and away from the mounting plate 150 about pivot pin 156 as shown in FIG. 5A. A roller 162 is mounted on one side of the label applicator head 146 that is adapted to engage a stop bracket 164 extending outwardly from the mounting plate 150. Therefore, when the label applicator head 146 and associated mounting plate 150 are retracted away from the loaded pallet 18 to the home position as shown in FIG. 3, the stop bracket 164 engages the roller 162 and causes the label applicator head 146 to pivot about pivot pin 156 to a position substantially parallel to the label applicator head mounting plate 150.

When the label applicator head 146 and associated mounting plate 150 are extended toward the loaded pallet 18 as shown in FIG. 5A, the label applicator head 146 pivots about the pivot pin 156 when the roller 162 disengages from the stop bracket 164 under the biasing force of spring 160. In the pivoted position, the label applicator head 146 is carried at an angle relative to the side 46 of the loaded pallet 18. The degree of pivoting is controlled by an adjustment screw 166 that extends from the mounting plate 150 into engagement with an abutment surface 168 (FIG. 5) formed on the label applicator head 146. The adjustment screw 166 can be retracted or extended to either increase or decrease the degree of rotation of the label applicator head 146 relative to the mounting plate 150. When the label applicator head 146 engages side 46 of the loaded pallet 18 as shown in FIG. 5B, the label applicator head 146 pivots about the pivot pin 156 to a position substantially parallel to the mounting plate 150. In this way, the pivoting movement of the label applicator head 146 from the position in FIG. 5A to the position in FIG. 5B improves contact and application of the printed label 40 to the side 46 of the loaded pallet 18 during the label application process and ensures reliable attachment of the printed label 40 to the loaded pallet 18.

Figure 7B:
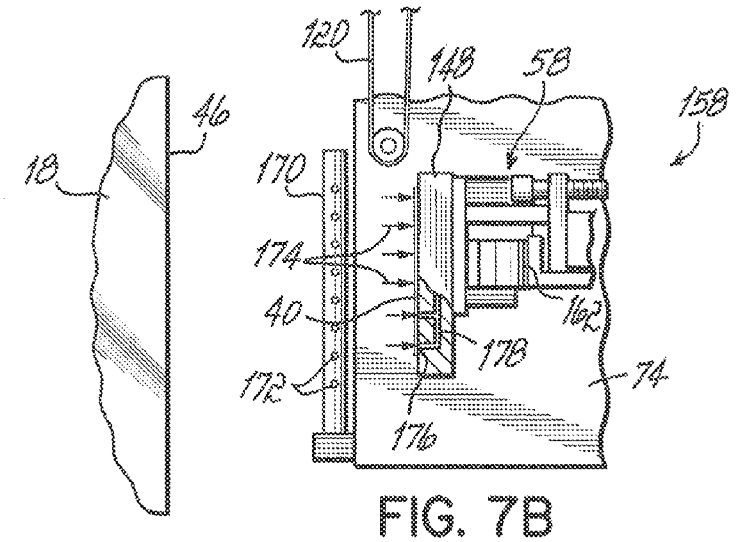
FIG. 7B is a view similar to FIG. 7A illustrating the printed label held to the label applicator head by vacuum pressure.

During the label printing process, the printed label 40 leaves the label printer 122 and separates from the backing web 120 as the backing web 120 turns sharply about a peel edge inside the printer 122. As shown in FIG. 7A, during the separation of the printed label 40 from the backing web 120, an air assist tube 170 mounted adjacent the label applicator head 156 in its retracted position is turned on to emit pressurized air from vertically and/or horizontally spaced outlets 172, shown diagrammatically as pressurized air jets 174, toward the printed label 40 to move the label 40 into engagement with the vacuum platen or tamp pad 148 of label applicator head 146. The tamp pad 148 includes a plurality of apertures 176 and bores 178 that are in fluid communication with a vacuum source (not shown) that is fluidly connected to the tamp pad 148 through a vacuum hose 180. As the label 40 is being separated from the backing web 122, the vacuum pressure supplied to the tamp pad 148 is turned off until the label has generally completely separated from the backing web 122 as shown in FIG. 7B. When generally complete separation of the label 40 and backing web 122 has occurred, vacuum pressure is then applied to tamp pad 148 to hold the label 40 thereto and the pressurized air jets 174 from the air assist tube 170 are turned off.

Figure 7C:
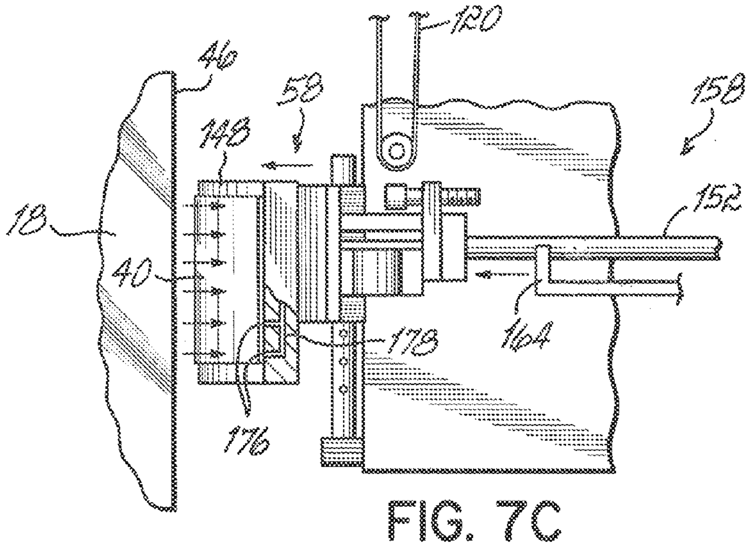
FIG. 7C is a view similar to FIG. 7A illustrating the printed label held to the label applicator head by vacuum pressure as it is transported toward the one side of the loaded pallet.

During the label application process, the label application head 146 is extended toward the loaded pallet 18 and pivots to the "transport position" as shown in FIG. 5A when the roller 162 disengages from the stop bracket 164 under the biasing force of spring 160. During transport of the printed label 40 toward the loaded pallet 18, vacuum is applied to the tamp pad 148 to hold the printed label 40 in proper position on the pad 148 as shown diagrammatically in FIG. 7C.

Figure 7D:
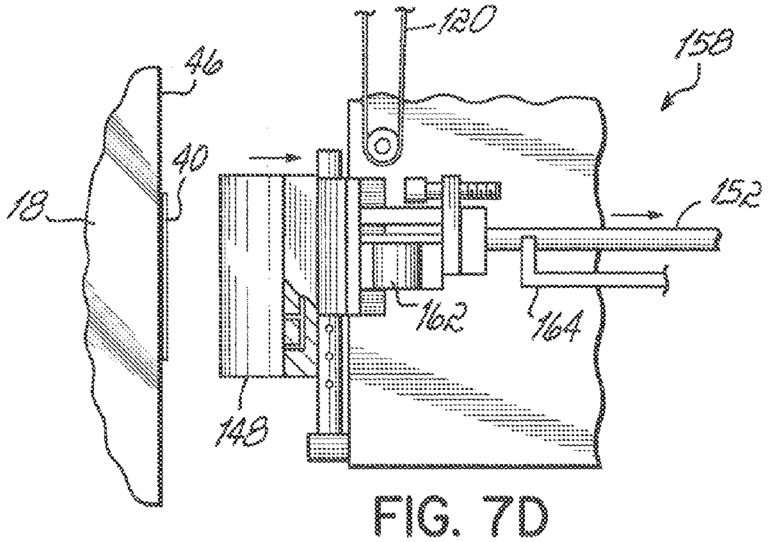
FIG. 7D is a view similar to FIG. 7A illustrating the label applicator head moving to a retracted position after applying the printed label to the one side of the loaded pallet.

When the printed label 40 is applied to the loaded pallet 18 as shown in FIG. 5B, the label applicator head 146 pivots to an "application position" that is generally parallel to the mounting plate 150 and the side 46 of the loaded pallet 18. The label applicator mechanism 138 includes a sensor 182, such as a proximity sensor or photo electric cell sensor, that is able to detect movement of the label applicator head 146 to the "application position" as shown in FIG. 5B. Upon detecting the "application position" of the label application head 146, the sensor 182 is operable to terminate application of vacuum pressure to the tamp pad 148, and the label application head 146 retracts toward a "home position" as shown diagrammatically in FIG. 7D. In this way, the selective application and termination of the pressurized air jets 174 and vacuum pressure to the tamp pad 148 reduces the amount of air used during the label printing and application process, and also reduces the likelihood that the apertures 176 formed in the tamp pad 148 will be become clogged with dust and other contaminants. Further, activation of sensor 182 ensures that tamp pad 148 has made sufficient contact with the side 46 of the loaded pallet 18 to affix the label 40 to the loaded pallet 18 despite irregularities in stretch-wrapping or loading of goods in the pallet load.

As shown in FIGS. 2 and 2A, the pallet labeler station 38 is capable of applying printed labels 40 to the loaded pallet 18 at a multiplicity of predetermined label positions, such as a lower position (FIG. 2) and an upper position (FIG. 2A). To this end, the pallet labeler system 38 is capable of receiving "label position data" through data communication link 32 from an upstream data source, such as the conveyor PLC 28, palletizer station PLC 30 and/or stretch-wrapper PLC 36, and to position the label applicator mechanism 138 so as to apply the printed label 40 to the loaded pallet 18 at the predetermined label position.

Figure 6A:
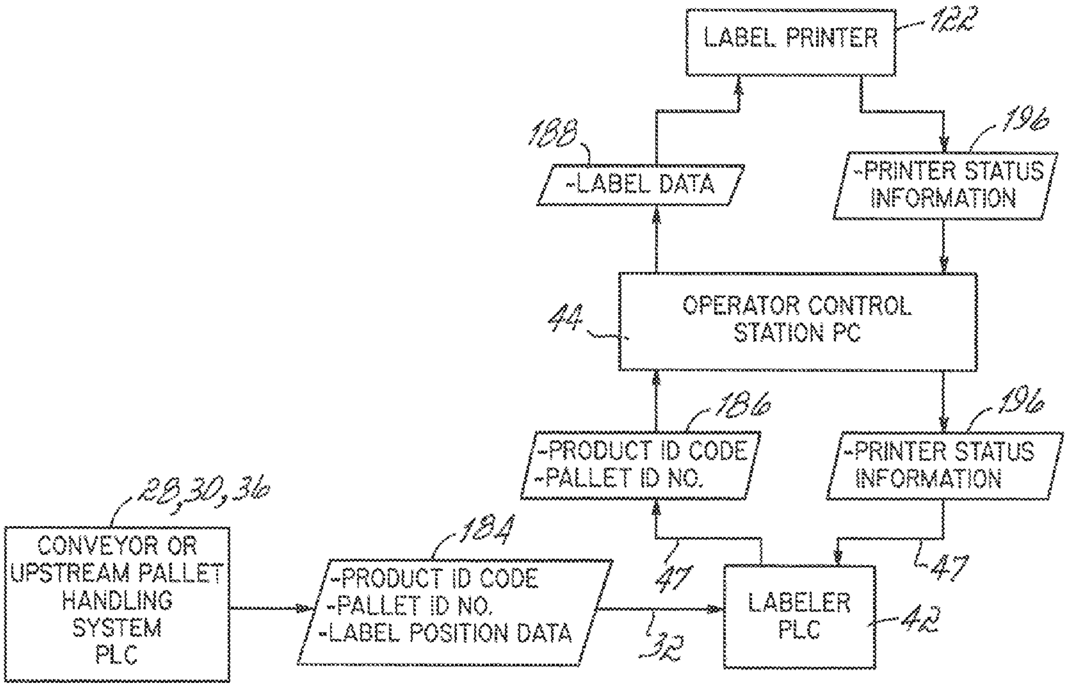
FIG. 6A is a diagrammatic view illustrating data transfer between the pallet handling system and the pallet labeler system in accordance with one embodiment of the present invention.

In one embodiment of the present invention, as shown in FIG. 6A, the pallet labeler station PLC 42 receives information from an upstream data source about a loaded pallet 18 coming to the station 38 to have one or more printed labels 40 applied thereto. More particularly, the pallet labeler station PLC 42 is coupled to one or more of the conveyor PLC 28, palletizer station PLC 30 and stretch-wrapper station PLC 36 through the data communication link 32. Each loaded pallet includes a "data packet", indicated diagrammatically at 184, that defines certain attributes about that particular loaded pallet 18. The data packet 184 may include the product identification code, pallet identification code, quantity, lot number, customer or order identification data and routing codes, to assist in identifying and routing of the particular pallet of goods within the warehouse or distribution center and also at a customer's facility. Additionally, in accordance with the present invention, the data packet 184 for a particular loaded pallet also includes "label position data" that defines one or more predetermined locations on the loaded pallet at which the printed labels are to be applied. For example, data packet 184 may include label position data for a lower label to be applied to the loaded pallet 18 and label position data for an upper label to be applied to the same loaded pallet 18. The label position data may be defined as the desired position of the label on the pallet as measured in inches from the ground and is input as data as part of the data packet 184 for that particular pallet load at a location upstream of the pallet labeler station 38. Of course, data packet 184 may contain label position data pertaining to one, two or more label positions for a single loaded pallet.

Still referring to FIG. 6A, the pallet labeler station PLC 42 transmits certain data, indicated diagrammatically at 186, such as the product identification code or pallet identification code, to the operator control station PC 44 through the data communication link 47. The operator control station PC 44 uses this information to generate label data, indicated diagrammatically at 188, that is applied to the label printer 122 so the label printer 122 prints a label having the desired label information and format for that particular pallet load. At about the same time that the operator control PC 44 is generating the label data to be applied to the label printer 122, the pallet labeler station PLC 42 is controlling the motor 80 to move the label applicator mechanism 138 in position so as to apply the printed label 40 at one of the predetermined label positions on the loaded pallet 18. After the printed label 40 has been applied, the label applicator mechanism 138 is moved so as to apply a printed label 40 at the next predetermined label position on the loaded pallet 18.

Positioning of the carriage assembly 58 is controlled by the PLC 42 and a sensor 190 coupled to the PLC 42 that is capable of determining the position of the carriage assembly 58 relative to the support pedestal 48, for example. In one embodiment of the present invention, the sensor 190 comprises an encoded rotary disk 192 that is keyed to the pinion 94. During movement of the carriage assembly 58, the encoded rotary disk 192 rotates with the pinion 94. A reading head 194 (FIG. 3) is mounted to the motor mounting bracket 92 and is operable to monitor the rotation of the encoded rotary disk 192 and apply signals to the PLC 42 that indicate the degree of rotation of the encoded rotary disk 192 as will be readily appreciated by those skilled in the art. By monitoring the position of the carriage assembly 58 through the sensor 190, the PLC 42 is able to accurately position the label positioning mechanism 138 so as to apply the printed label 40 at the proper label position as defined in the data packet 184. After all labels 40 have been applied to loaded pallet 18, the carriage assembly 58 is lowered to its lowermost position so that the sensor 190 is reset to eliminate drift prior to the next pallet labeling cycle. Printer status information, indicated diagrammatically at 196, is applied from the label printer 122 to the operator control station PC 44, and from the operator control station PC 44 to the PLC 42. In this way, the carriage assembly 58 is only moved when the label printer 122 is in a proper status condition to print a desired label.

Figure 6B:
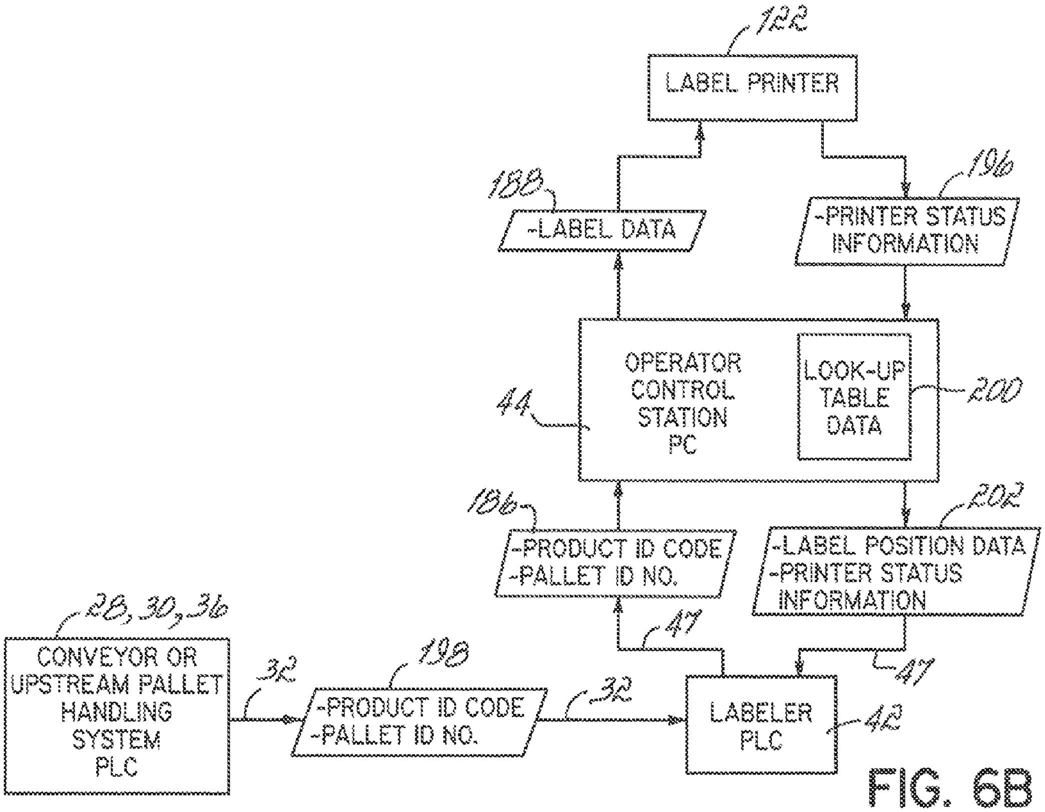
FIG. 6B is a view similar to FIG. 6A illustrating data transfer between the pallet handling system and the pallet labeler system in accordance with an alternative embodiment of the present invention.

In the alternative embodiment of the present invention as shown in FIG. 6B, the pallet labeler station PLC 42 does not receive the label position data in a data packet 198 received from an upstream station through the data communication link 32. Rather, in this embodiment, the operator control station PC 44 includes a look-up table 200 (FIG. 6C) from which the label position data can be obtained from the product identification code or pallet identification number transmitted in the data packet 198. For example, as shown in FIG. 6C, the look-up table 200 correlates the product identification code or pallet identification number with one or more label position data pertaining to a particular pallet load. The label position data is applied to the PLC 42 from the operator control station PC 44, indicated diagrammatically at 202 in FIG. 6B. The PLC 42 uses the label position data 202 to control positioning of the carriage assembly 58 as described in detail above so as to properly position the label applicator mechanism 138 to apply a printed label 40 to the loaded pallet 18 at the predetermined label position as defined by the "label position data" obtained from the look-up table 200.

It will be appreciated that pallet labeler station 38 has the particular advantage of applying printed labels to a loaded pallet at a multiplicity of label positions. The rack and pinion drive mechanism 84 provides variable movement of the label applicator mechanism 138 relative to the loaded pallet 18. The predetermined label positions are defined in software by the "label position data" that is either received from upstream loaded pallet handling stations or is obtained from the look-up table 200 in the operator control station PC 44. The combination of the pre-programmed "label position data", rack and pinion drive mechanism 84 and sensor 190 provides for accurate, repeatable and efficient application of printed labels to pallet loads at a multiplicity of variable label positions.

Figure 8:
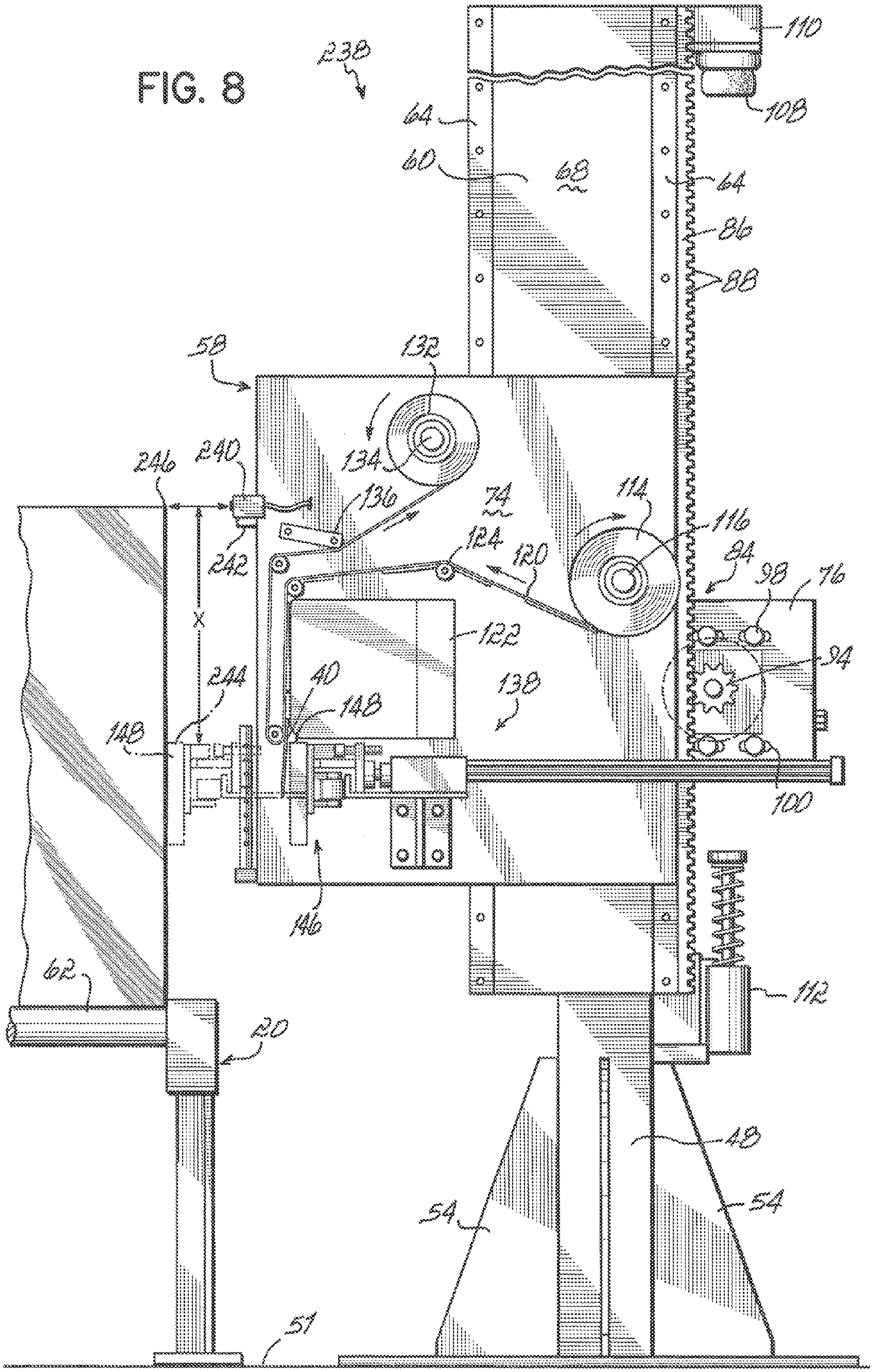
FIG. 8 is a partial side elevational view of a pallet labeler system in accordance with an alternative embodiment of the present invention for applying a printed label to one side of a loaded pallet at a fixed distance below the top of the loaded pallet.

In an alternative embodiment, a pallet labeler station 238 in accordance with the principles of the present invention is shown in FIG. 8, wherein like numeral represent like parts to the pallet labeler station 38 of FIGS. 1-7D. In this embodiment, pallet labeler station 238 includes a sensor 240, such as a photo-eye detector, mounted to the carriage assembly 58 through mounting bracket 242. Sensor 240 is mounted a predetermined distance "X" above an upper surface 244 of the tamp pad 148 and is coupled to the PLC 42 of the pallet labeler system 238. In this embodiment, pallet labeler station 238 is configured to apply the printed label 40 a predetermined distance below the top edge 246 of the loaded pallet 18, as defined by the spacing "X" between the upper surface 244 of the tamp pad 148 and the sensor 240. This may be advantageous when there are a wide range of different height pallet loads to be labeled, and it is desirable to apply the printed label 40 at a common location on each loaded pallet 18 rather than applying the label 40 to a predetermined label position for each pallet load.

In use, the loaded pallet 18 is stopped so that side 46 of the loaded pallet faces the pallet labeler station 238. Carriage assembly 58 is moved upwardly relative to the support pedestal 48 until the sensor 240 detects the top edge 246 of the pallet load. At this position, sensor 240 applies a signal to pallet labeler station PLC 42 that stops further upward movement of the carriage assembly 58. The label printing and application cycle is initiated so that label applicator mechanism 138 extends label applicator head 146, and in particular tamp pad 148, into contact with the loaded pallet 18 to apply a printed label 40 a distance "X" below the top edge 246 of the pallet load.

Referring now to FIGS. 9, 9A-B, 10 and 10A, a pallet labeler station 300 is shown in accordance with another alternative embodiment of the present invention, wherein like numerals represent like parts to the pallet labeler station 38 of FIGS. 1-7D. In this embodiment, a rotatable label applicator mechanism 302 is supported for rotation on the carriage assembly 58 for applying one or more labels to a single side or two adjacent sides of the loaded pallet 18 as will be described in greater detail below.

The label applicator mechanism 302 includes a label applicator arm 304 which is rotatably mounted to a support 305 of the carriage assembly 58 through a rotary actuator 306. The rotary actuator 306 is operable to rotate the label applicator arm 304 generally ninety degrees (90°) about a vertical axis 308 between a "home" position shown in FIG. 9 to a fully rotated position shown in phantom in FIG. 9. In the "home" position, the label applicator arm 304 extends generally parallel to the conveying direction 22 of the conveyor 20 and is positioned to receive printed labels 40 from the label printer (not shown) as described in detail below. In its fully rotated position toward the loaded pallet 18, the label applicator arm 304 is positioned to extend into the travel path of the loaded pallet 18 as it is conveyed on the conveyor 20. The rotary actuator 306 may be a pneumatically controlled rotary actuator, such as the Model PTR2520903AA21-C rotary actuator commercially available from Parker Hannifin Corporation of Wadsworth, Ohio, or any other suitable rotary drive mechanism capable of rotating the label applicator arm 304 about the axis 308 as will be appreciated by those of ordinary skill in the art.

Figure 9:
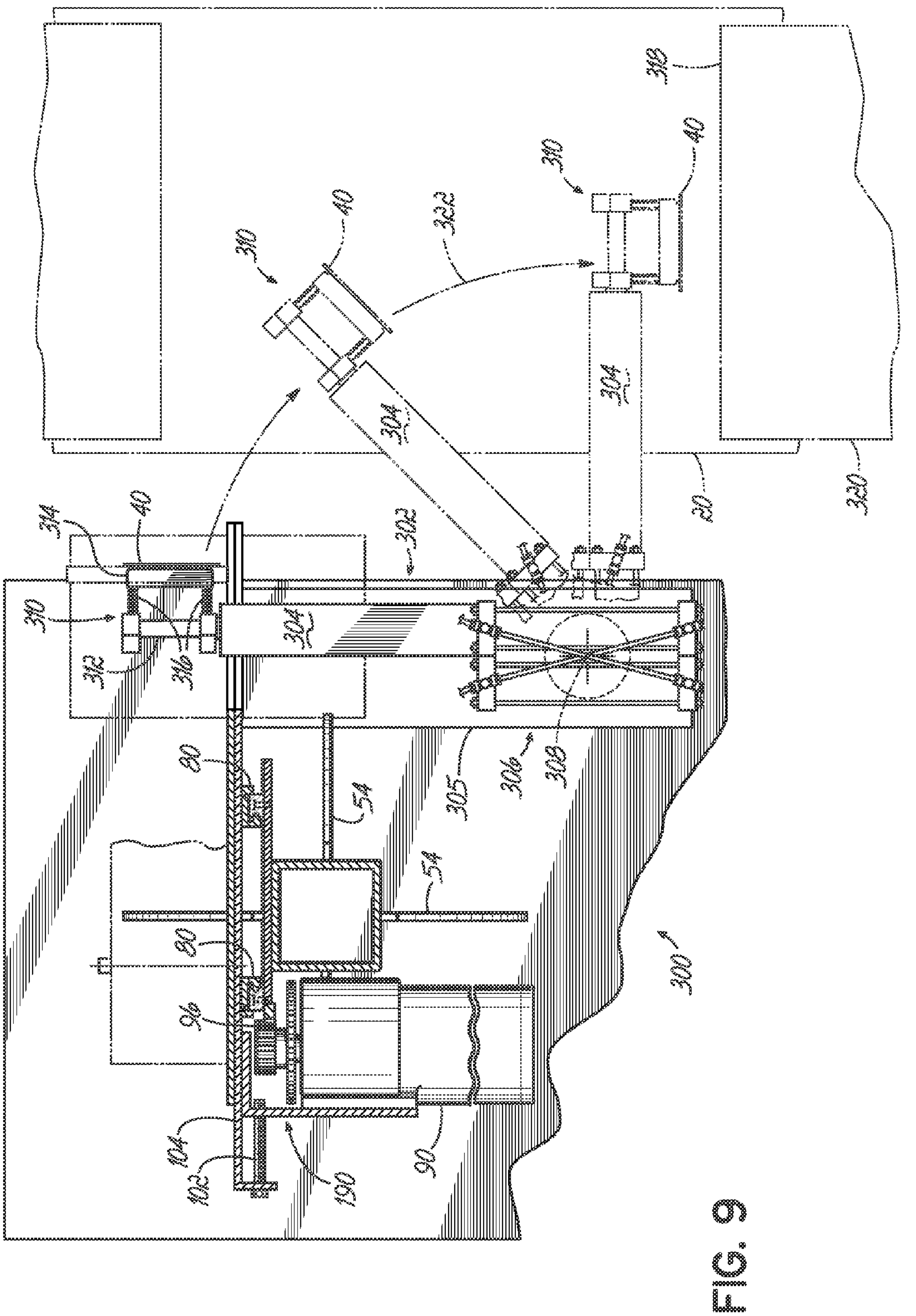
FIG. 9 is a partial top view showing a pallet labeler system in accordance with another alternative embodiment of the present invention, illustrating rotation of a label applicator head from a "home" position toward one side of a loaded pallet.

Further referring to FIG. 9, the rotatable label applicator arm 304 has one end supported by the rotary actuator 306 and a free end which supports a label applicator head 310. The label applicator head 310 includes a label applicator head support 312 and a vacuum platen or tamp pad 314 which is biased outwardly from the label applicator head support 312 through springs 316.

During the label printing process, the printed label 40 leaves the label printer (not shown) and separates from the backing web (not shown) as described in detail above in connection with the pallet labeler station 38 of FIGS. 1-7D. During the separation of the printed label 40 from the backing web (not shown), an air assist tube (not shown) mounted adjacent the label applicator head 310 when it is located in its "home" position is turned on to emit pressurized air toward the printed label 40 to move the label 40 into engagement with the vacuum platen or tamp pad 314 of label applicator head 310. As the label 40 is being separated from the backing web (not shown), the vacuum pressure supplied to the tamp pad 314 is turned off until the label 40 has generally completely separated from the backing web (not shown). When generally complete separation of the label 40 and backing web (not shown) has occurred, vacuum pressure is then applied to tamp pad 314 to hold the label 40 thereto and the pressurized air jets of from the air assist tube (not shown) are turned off.

In one embodiment, the pallet labeler station 300 is operable to apply a single printed label 40 to a front or leading side 318 of the loaded pallet 18 and to the side 320 of the loaded pallet 18 which faces the pallet labeler station 300. The pallet labeler station 300 is operable to apply a printed label 40 to each side 318 and 320 of the loaded pallet 18 at a predetermined height location which may be the same or different for each side 318 and 320. The predetermined label height location for each side 318 and 320 is defined by the "label position data" received by the pallet labeler station 300, as described in detail above in connection with the pallet labeler station 38. The "label position data" controls vertical movement of the carriage assembly 58 to accurately position the label applicator mechanism 302 so as to apply the printed label 40 at the proper height location for each side 318 and 320 of the loaded pallet 18 as defined by the "label position data".

Figure 9A:
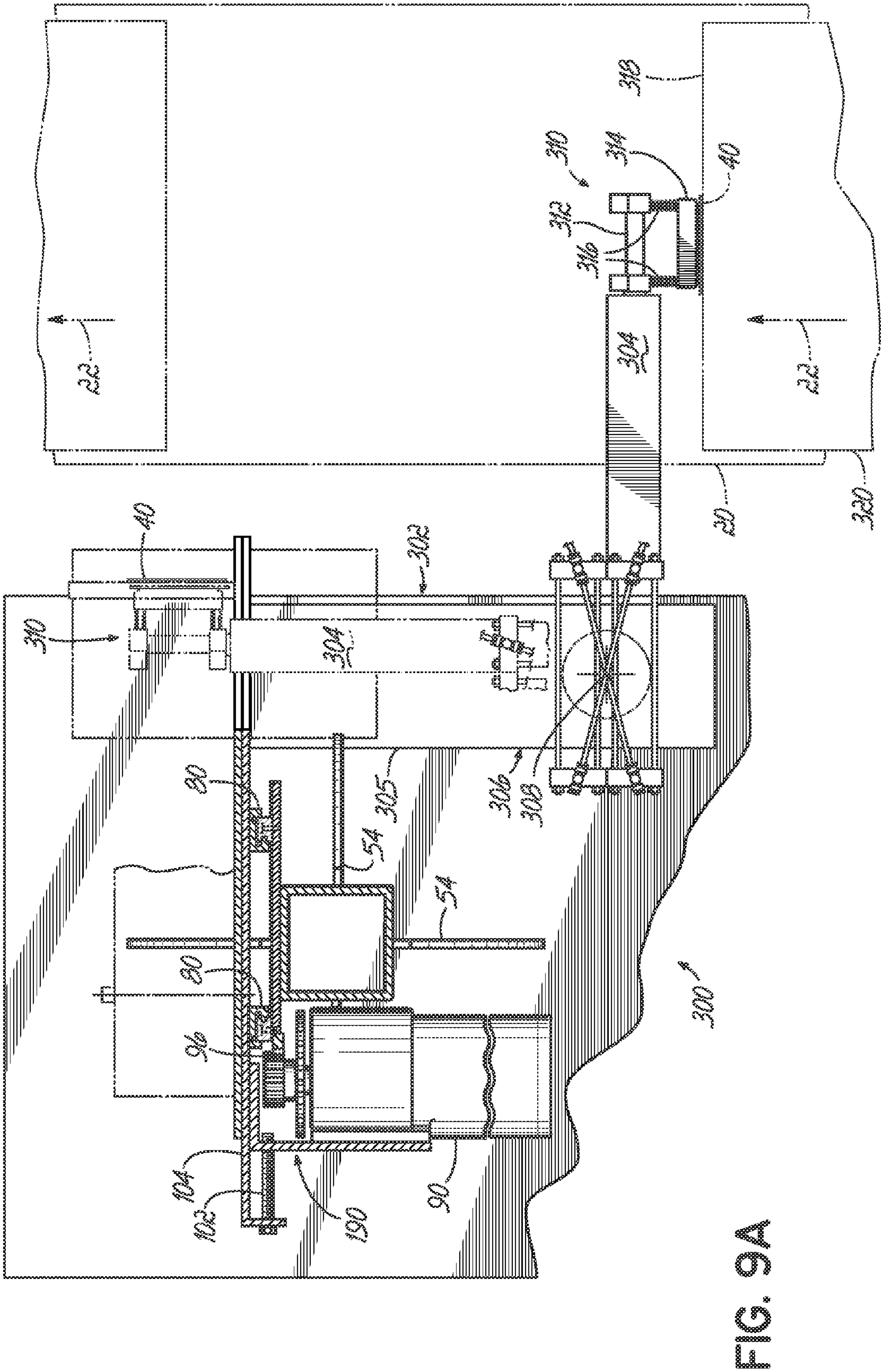
FIG. 9A is a view similar to FIG. 9, illustrating the loaded pallet moving into contact with the label applicator head for applying a printed label to the one side of the loaded pallet.
Figure 9B:
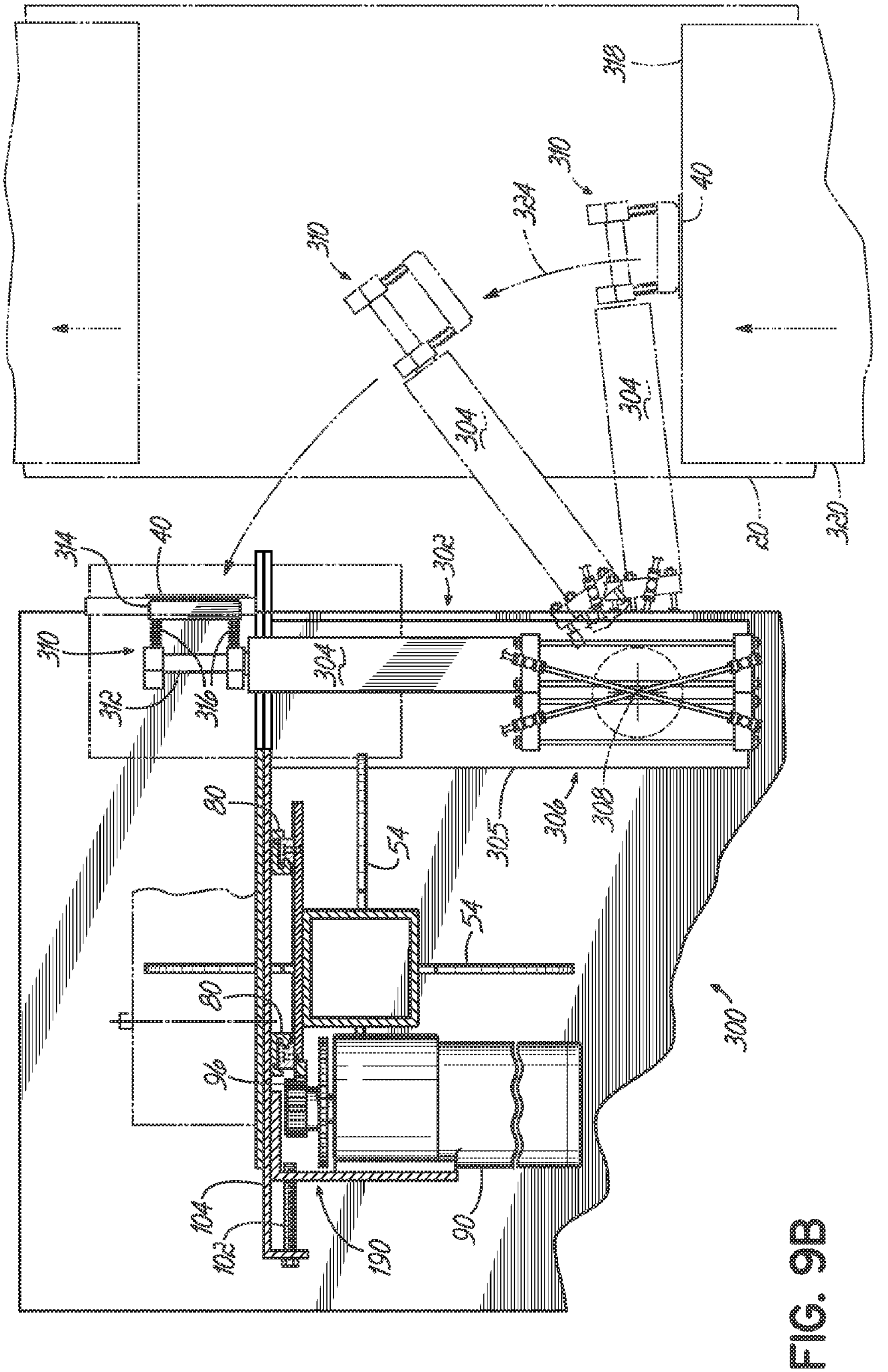
FIG. 9B is a view similar to FIG. 9, illustrating rotation of the label applicator head toward the "home" position.

For applying a printed label 40 to the front or leading side 318 of the loaded pallet 18 as shown in FIGS. 9, 9A and 9B, the carriage assembly 58 and rotatable label applicator mechanism 302 are positioned at the predetermined label height for the front or leading side 318 as defined by the "label position data". As a loaded pallet 18 approaches the pallet labeler station 300, a sensor (not shown) senses the incoming loaded pallet 18 and, in response thereto, causes the conveyor 20 to stop the loaded pallet 18 downstream of the fully rotated position of the label applicator arm 304. The rotary actuator 306 thereafter rotates the label applicator arm 304 and label applicator head 310, with the printed label 40 held thereto by vacuum, ninety degrees (90°), as indicated by arrow 322, so that the tamp pad 314 is positioned in the travel path of the loaded pallet 18 on the conveyor 20.

As shown in FIG. 9A, the loaded pallet 18 is thereafter advanced in the direction of arrow 22 toward the tamp pad 314 so as to contact and compress the tamp pad 314 as the printed label 40 is applied to the front side 318 at the predetermined label height defined by the "label position data". As the loaded pallet 18 continues to advance on the conveyor 20 in the direction of arrow 22, the label applicator arm 304 is caused to initially rotate back toward the "home position" as indicated by arrow 324. A sensor (not shown) is provided to sense the initial return movement of the label applicator arm 304 and, in response thereto, causes the rotary actuator 306 to rotate the label applicator arm 304 in the direction of arrow 322 back to the "home position" as shown in FIG. 9B.

Figure 10:
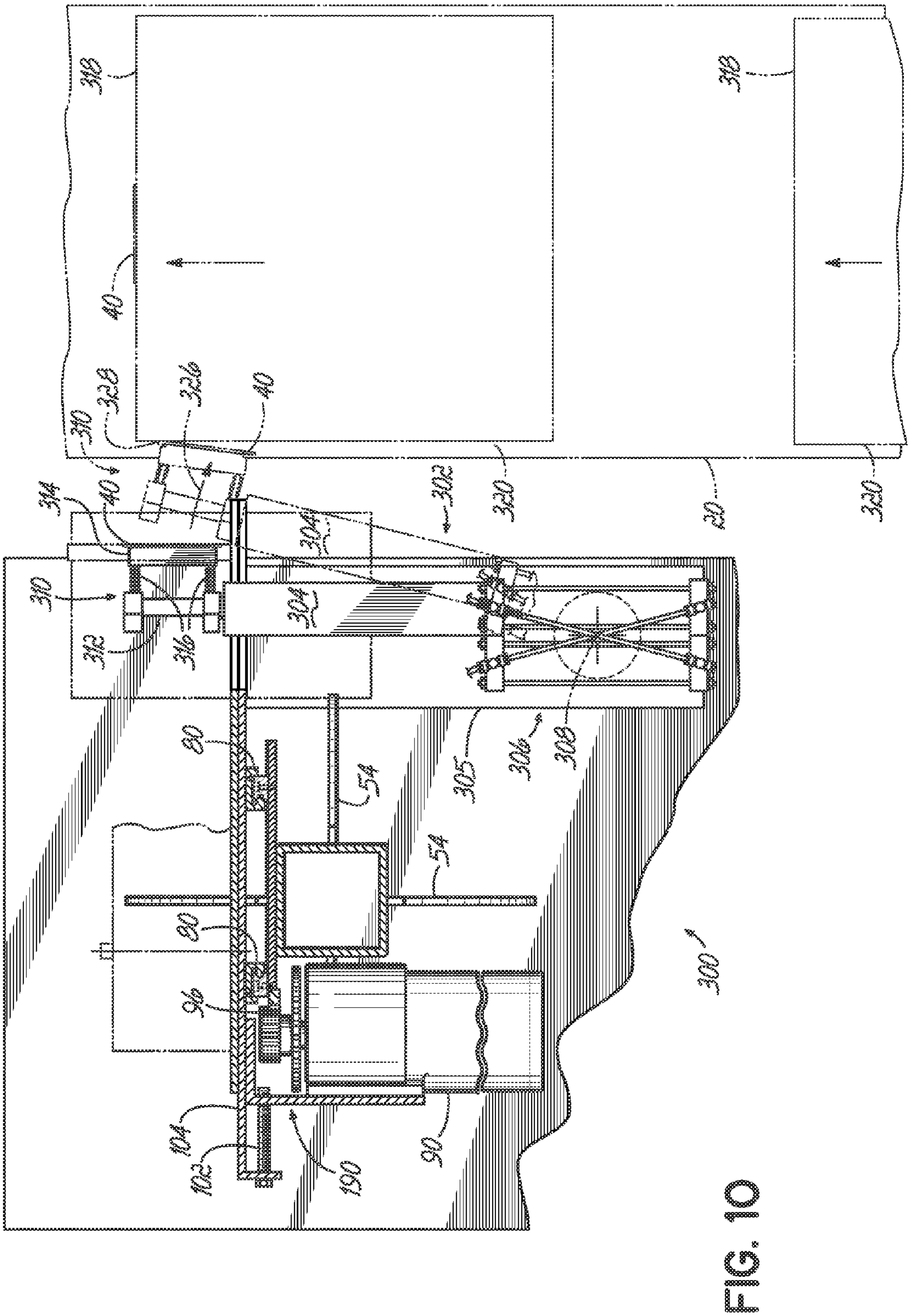
FIG. 10 is a view similar to FIG. 9, illustrating rotation of the label applicator head from the "home" position into contact with an adjacent side of the loaded pallet for applying a printed label to the adjacent side.

Referring now to FIG. 10, the carriage assembly 58 and rotatable label applicator mechanism 302 are thereafter positioned at the predetermined label height for the side 320 as defined by the "label position data" which may be the same as or different from the predetermined label height for the front or leading side 318. As the loaded pallet 18 approaches the pallet labeler station 300, a second sensor (not shown) senses the incoming loaded pallet 18 and, in response thereto, causes the conveyor 20 to stop the loaded pallet 18 so that the side 320 of the loaded pallet 18 faces the pallet labeler station 300.

Figure 10A:
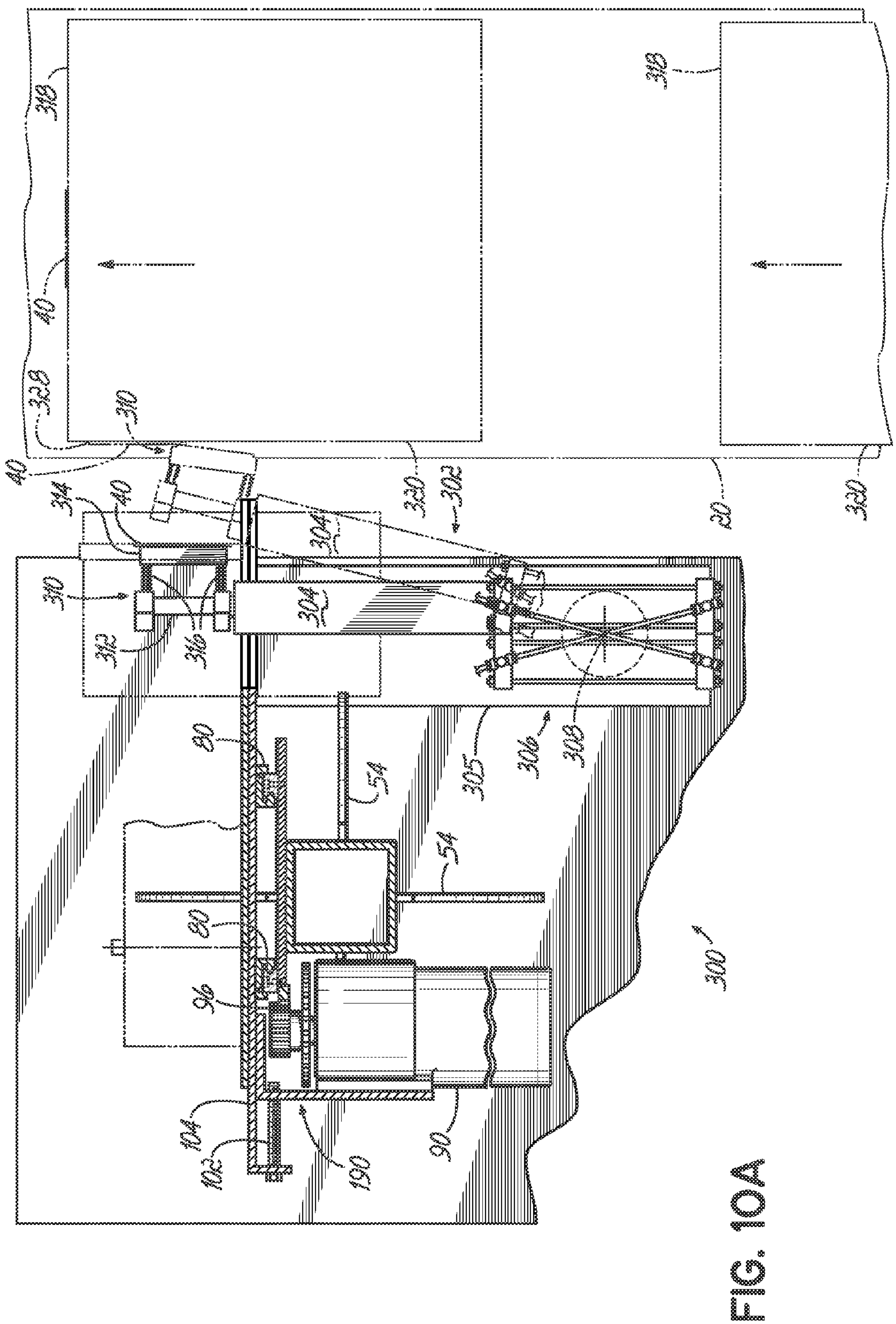
FIG. 10A is a view similar to FIG. 9, illustrating the label applicator head applying the printed label to the adjacent side of the loaded pallet.

The label applicator mechanism 302 receives a second printed label 40 from the label printer (not shown) which is held to the label applicator head 310 by vacuum applied to the tamp pad 314. The rotary actuator 306 thereafter rotates the label applicator arm 304 and label applicator head 310, with the printed label 40 held thereto by vacuum, in the direction of arrow 326 toward the side 320 so that a leading edge 328 of the printed label 40 contacts the side 320 of the loaded pallet 18. Thereafter, as shown in FIG. 10A, the loaded pallet 18 is advanced on the conveyor 20 in the direction of arrow 22 so that the tamp pad 314 screeds or wipes the printed label 40 onto the side 320 of the loaded pallet 18 at the predetermined label position defined by the "label position data".

The pallet labeler station 300 is operable to apply one or multiple printed labels 40 to a single side or to adjacent sides of the loaded pallet 18 at a multiplicity of predetermined label height positions as defined by the "label position data". When applying multiple printed labels 40 to one side of the loaded pallet 18, the label applicator mechanism 302 receives a printed label 40 from the label printer (not shown) and the carriage assembly 58 and rotatable label applicator mechanism 302 are positioned at a first predetermined label height for that side of the loaded pallet 18. The label applicator arm 304 is rotated and the conveyor 20 is operated as necessary so as to apply the printed label 40 to the one side of the loaded pallet 18 at the first predetermined label height. Thereafter, the label applicator arm 304 is rotated to the "home" position so that the label applicator mechanism receives a second printed label 40 from the label printer (not shown) and the carriage assembly 58 and rotatable label applicator mechanism 302 are positioned at a second predetermined label height for that side of the loaded pallet 18. The label applicator arm 304 is then rotated and the conveyor 20 operated as necessary so as to apply the printed label 40 to the one side of the loaded pallet 18 at the second predetermined label height.

While the present invention has been illustrated by a description of various embodiments and while these embodiments have been described in considerable detail, it will be appreciated by those of ordinary skill in the art that departures may be made from such details without departing from the spirit or scope of applicants' invention. For example, while the terms "upper", "lower", "above" and "below" have been used herein to discuss one embodiment of the present invention, it will be understood that other orientations of the pallet labeler station components and loaded pallet 18 are possible without departing from the spirit and scope of the present invention. The invention in its broader aspects is therefore not limited to the specific details, representative apparatus and method, and illustrative example shown and described.

The invention claimed is:

1. A method for applying a printed label to one side of a loaded pallet at a pallet labeler station having a label applicator mechanism including a label applicator arm rotatable about a generally vertical axis, comprising:

generating data that defines a predetermined label position on the loaded pallet;

printing a label with information relevant to goods loaded on the pallet;

moving the label applicator arm in a verticle direction; and rotating the label applicator arm about the generally vertical axis so as to apply the printed label with the label applicator mechanism to the loaded pallet at the predetermined label position defined by the data, the label applicator arm rotating about the generally vertical axis during application of the printed label to the one side of the loaded pallet.

2. The method of claim 1, wherein the step of generating the data that defines the predetermined label position on the loaded pallet comprises the step of:

receiving the label position data from an upstream pallet handling apparatus.

3. The method of claim 1, wherein the step of generating the data that defines the predetermined label position on the loaded pallet comprises the steps of:

receiving data relevant to the goods loaded onto the pallet from an upstream pallet handling apparatus; and deriving the label position data from the data relevant to the goods loaded onto the pallet and other data.

4. The method of claim 3, wherein the label position data is derived from a look-up table containing data relevant to the goods loaded onto the pallet.

5. A method for applying a printed label to two sides of a loaded pallet at a pallet labeler station having a label applicator mechanism including a label applicator arm rotatable about a generally vertical axis, comprising:

generating data that defines a predetermined label position on the loaded pallet for each of the two sides of the loaded pallet;

printing labels with information relevant to goods loaded on the pallet;

moving the label applicator arm in a verticle direction; and rotating the label applicator arm about the generally vertical axis so as to apply the printed labels with the label applicator mechanism to each of the two sides of the loaded pallet at the predetermined label positions defined by the data, the label applicator arm rotating about the generally vertical axis during application of the printed labels to the two sides of the loaded pallet.

6. The method of claim 5, wherein the step of generating the data that defines the predetermined label position on each of the two sides of the loaded pallet comprises the step of:

receiving the label position data from an upstream pallet handling apparatus.

7. The method of claim 5, wherein the step of generating the data that defines the predetermined label positions on each of two sides of the loaded pallet comprises the steps of:

receiving data relevant to the goods loaded onto the pallet from an upstream pallet handling apparatus; and deriving the label position data from the data relevant to the goods loaded onto the pallet and other data.

8. The method of claim 7, wherein the label position data is derived from a look-up table containing data relevant to the goods loaded onto the pallet.

* * * * *

UNITED STATES PATENT AND TRADEMARK OFFICE

CERTIFICATE OF CORRECTION

PATENT NO. : 7,354,498 B2
APPLICATION NO. : 11/682033
DATED : April 8, 2008
INVENTOR(S) : Gary E. Jenkins et al.

It is certified that error appears in the above-identified patent and that said Letters Patent is hereby corrected as shown below:

In column 2, line 27, change “pallet labeler system includes” to --pallet labeler systems includes--.

In column 6, line 58, change “pedestal mounting plate 74 are made of” to --pedestal mounting plate 76 are made of--.

In column 8, line 12, change “mounting plate 150 include a” to --mounting plate 150 includes a--.

In column 9, line 46, change “will be become clogged” to --will become clogged--.

In column 11, line 43, change “wherein like numeral represent like parts” to --wherein like numerals represent like parts--.

In column 12, line 59, change “pressurized air jets of from the air assist tube” to --pressurized air jets from the air assist tube--.

In claim 1, column 14, line 46, change “moving the label applicator arm in a verticle direction;” to --moving the label applicator arm in a vertical direction;--, as shown in the Notice of Allowance mailed on December 20, 2007, Examiner’s Amendment at Page 2, number one, paragraph 4, claim 19 (now claim 1).

UNITED STATES PATENT AND TRADEMARK OFFICE

CERTIFICATE OF CORRECTION

PATENT NO. : 7,354,498 B2 
APPLICATION NO. : 11/682033
DATED : April 8, 2008
INVENTOR(S) : Gary E. Jenkins et al.

It is certified that error appears in the above-identified patent and that said Letters Patent is hereby corrected as shown below:

In claim 5, column 15, line 13, change “moving the label applicator arm in a verticle direction;” to --moving the label applicator arm in a vertical direction;--, as shown in the Notice of Allowance mailed on December 20, 2007, Examiner’s Amendment at Page 2, number one, paragraph 4, claim 23 (now claim 5).

Signed and Sealed this

Twenty-eighth Day of April, 2009

JOHN DOLL
*Acting Director of the United States Patent and Trademark Office*